(12) United States Patent
Kaiser et al.

(10) Patent No.: US 7,720,674 B2
(45) Date of Patent: May 18, 2010

(54) SYSTEMS AND METHODS FOR PROCESSING NATURAL LANGUAGE QUERIES

(75) Inventors: Matthias Kaiser, Mountain View, CA (US); Jacob A Klein, Sunnyvale, CA (US); Hartmut Vogler, Foster City, CA (US); Shan Jiang, Mountain View, CA (US)

(73) Assignee: SAP Ag, Walldorf (DE)

( * ) Notice: Subject to any disclaimer, the term of this patent is extended or adjusted under 35 U.S.C. 154(b) by 1192 days.

(21) Appl. No.: 10/878,307

(22) Filed: Jun. 29, 2004

(65) Prior Publication Data

US 2005/0289124 A1    Dec. 29, 2005

(51) Int. Cl.
*G06F 17/27* (2006.01)
(52) U.S. Cl. ............... 704/9; 704/1; 704/7; 704/10; 704/270
(58) Field of Classification Search ............ 704/9, 704/1, 7, 10
See application file for complete search history.

(56) References Cited

U.S. PATENT DOCUMENTS

| | | | | |
|---|---|---|---|---|
| 4,974,191 A | * | 11/1990 | Amirghodsi et al. | 704/8 |
| 6,766,320 B1 | * | 7/2004 | Wang et al. | 707/5 |
| 7,302,394 B1 | * | 11/2007 | Baray et al. | 704/257 |
| 2003/0069880 A1 | * | 4/2003 | Harrison et al. | 707/3 |
| 2003/0217052 A1 | * | 11/2003 | Rubenczyk et al. | 707/3 |

* cited by examiner

*Primary Examiner*—Qi Han
(74) *Attorney, Agent, or Firm*—Finnegan, Henderson, Farabow, Garrett & Dunner LLP

(57) ABSTRACT

Methods and systems are provided for processing natural language queries. Such methods and systems may receive a natural language query from a user and generate corresponding semantic tokens. Information may be retrieved from a knowledge base using the semantic tokens. Methods and systems may leverage an interpretation module to process and analyze the retrieved information in order to determine an intention associated with the natural language query. Methods and systems may leverage an actuation module to provide results to the user, which may be based on the determined intention.

48 Claims, 7 Drawing Sheets

User query: *"Add Sales Organization and show only Hamburg"*
- Uncertainty: Hamburg could be part of a customer name, contact information, product or sales organization
- Solution: an agent policy that accounts for adjacency would give the Hamburg sales organization master data priority

User input: *The user then adds "Just show Frankfurt"*
- Uncertainty: Again, there is master data ambiguity.
- Solution: An agent network can use the context provided by the current query (see above) to infer that the user is interested only in the Frankfurt sales organization master data.

User query: *"Create a chart"*
- Uncertainty: Information is missing regarding the kind of chart (bar or pie for example).
- Solution: The agent network (based upon a policy) can prompt the user to include the missing information in the query.

User query: *"Show the amount of stationary sold in the US last year and convert to Euros"*
- Uncertainty: This is a compound request involving several steps that must be ordered properly.
- Solution: The agent network (again based upon a configurable policy) will call the appropriate APIs in sequence.

User query: *"Show me all conference rooms that are available on July 2 at 10:30 AM."*
- Uncertainty: No rooms are available at 10:30, but instead at 10:00 and 11:00
- Solution: The agent network can match the next-best results and prompt the user to determine if 10:00 or 11:00 would suffice.

Fig. 6

SYSTEMS AND METHODS FOR PROCESSING NATURAL LANGUAGE QUERIES

BACKGROUND OF THE INVENTION

1. Field of the Invention

The present invention generally relates to information systems, and more particularly, to methods and systems for processing natural language queries for information in a structured knowledge base. In one example, the present invention may provide an interface through which information can be retrieved from a data archive in response to natural language queries.

2. Description of the Related Art

The advent of high performance data processing systems has greatly improved information accessibility. Using modern computers and processors, information from various sources can be almost instantaneously obtained. However, the value of information access is often frustrated by an inability to effectively cope with and exploit it. For example, given the vast amount of accessible information, it is often difficult and cumbersome to discern relevant data from extraneous information. Although information access is advancing, tools which facilitate the conversion of such information into useful and profitable knowledge are lacking.

Search engines represent one tool commonly used with Internet and other computer applications to provide information access. Typically, search engines index the content of a given system, and provide users with results by comparing queries with entries in the index. Conventional searching systems, however, cannot be tailored to a plurality of users having distinctive vernaculars and/or language preferences. Further, typical search engines are unable to dynamically learn by user feedback. That is, the utility of conventional searching tools does not improve with increased use. Moreover, conventional searching mechanisms are limited by a user's ability to articulate the query. For example, the user will not obtain useful results if the searching system fails to recognize the inputted query or the inputted query does not properly relate to the information sought.

Certain information access tools allow users to enter natural language queries, such as "How many German cars were sold in the US last year?" However, such systems are not easily personalized for different users. Further, these systems often lack the ability to dynamically incorporate and utilize user feedback to improve performance and efficiency. Thus, like other systems, the utility of these tools are not readily improved by way of increased use. Moreover, like other conventional systems, these tools are unable to effectively deal with ambiguities resulting from query terms. These systems also lack the ability to effectively deal with freeform and non-grammatical language queries. In addition, such natural language search tools are limited in their ability to effectively filter relevant information based on natural language input.

Methods, systems, and articles of manufacture consistent with certain embodiments of the present invention are directed to obviating one or more of the problems set forth above.

SUMMARY

Systems and methods consistent with principles of the present invention may process natural language queries. Systems and methods may obtain a natural language query from a user and generate one or more semantic tokens from the natural language query. Information may be identified in a knowledge base using the semantic tokens. Methods and systems consistent with the present invention may determine an intention associated with the natural language query. Methods and systems may interpret the identified information based on the intention and actuate the interpreted information. Consistent with the present invention, methods and systems may provide information that is relevant to the natural language query to the user based on a determined intention.

Methods and systems consistent with the present invention may obtain a natural language query from a source. Methods and systems may retrieve data that is potentially relevant to a natural language query from a knowledge base. Methods and systems may process the potentially relevant data in accordance with an intention associated with the natural language query so as to identify actually relevant data from the potentially relevant data. Methods and systems may provide the actually relevant data to the source.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

FIG. 6 illustrates exemplary features and aspects consistent with embodiments of the present invention may be implemented.

DETAILED DESCRIPTION

Figure 1:
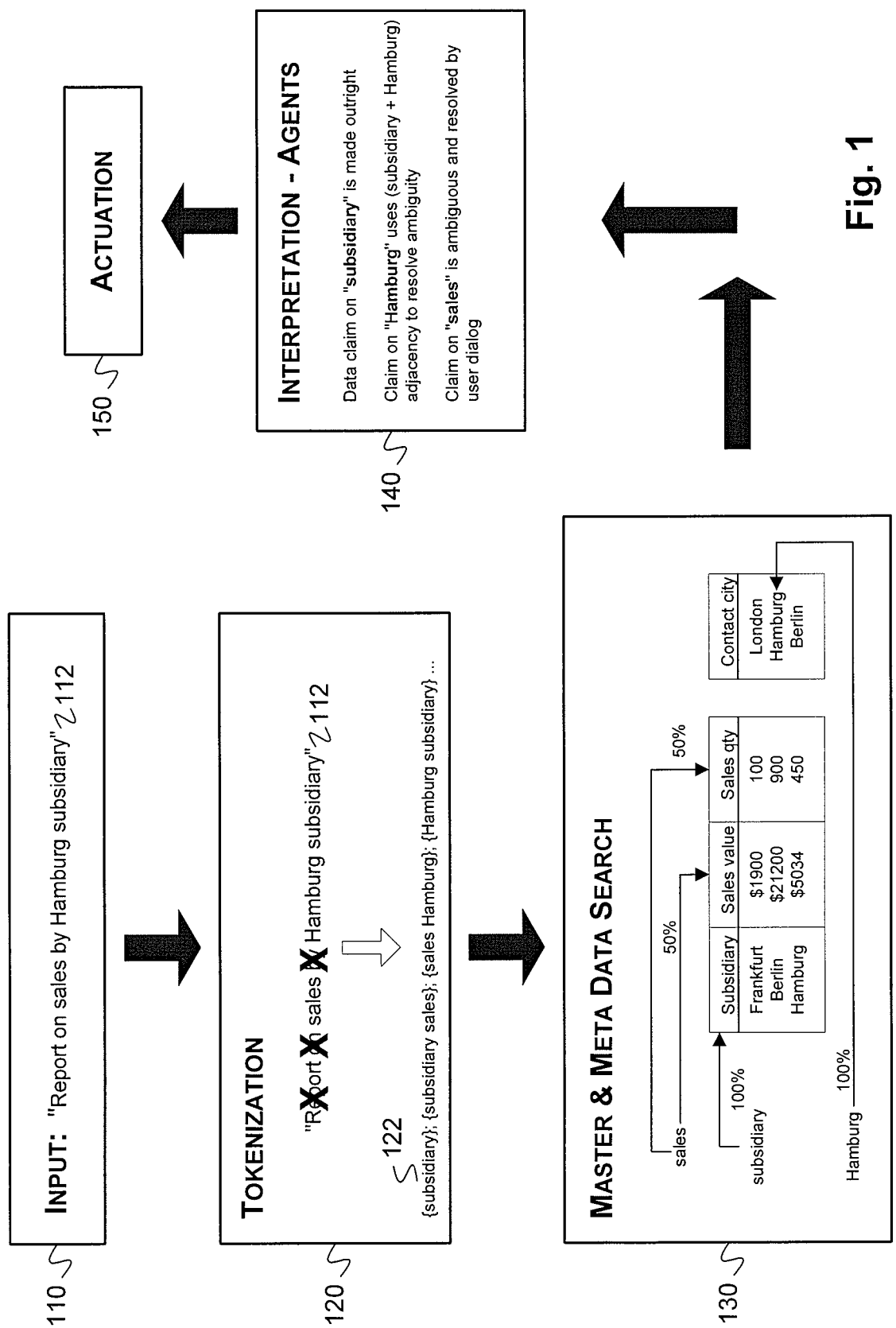
FIG. 1 is a diagram conceptually illustrating features and aspects consistent with certain embodiments of the present invention.

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, which are described in sufficient detail to enable those skilled in the art to practice the invention. The description of the exemplary embodiments does not indicate or imply that other embodiments or implementations do not fall within the scope of present invention. It is to be understood that other implementations may be utilized and that structural and method changes may be made without departing from the scope of present invention.

Conceptual Overview

Consistent with embodiments of the present invention, methods and systems may process natural language queries for information in a structured knowledge base. Features and aspects consistent with embodiments of the present invention are illustrated by way of the exemplary functional blocks shown in FIG. 1 As illustrated, systems and methods consistent with the present invention may provide input functionality 110, tokenization functionality 120, a Master and Meta Data Search (MMDS) functionality 130, interpretation functionality 140, and actuation functionality 150.

Input functionality 110 may represent methods and systems for acquiring input from one or more users, systems, and/or entities, which may be used to retrieve information. As illustrated in FIG. 1, such input may include one or more natural language queries 112 that request data located in one or more data archives. Natural language query 112 may, for example, include any combination of terms physically and/or verbally input by a user via a computer system. In certain embodiments of the present invention, one or more user interface modules may be provided in order to facilitate user input.

Tokenization functionality 120 may represent methods and systems for tokenizing received input. Tokenizing queries may involve extracting conceptual components and removing certain terms (e.g., and, on, by, etc.) in order to prepare the query for processing. As illustrated in FIG. 1, natural language query 112 may be transformed into a set of semantic tokens 122, which may be relayed to one or more search engines for processing. Tokens may be alphabetically-, numerically-, alphanumerically-, symbolically-, and delimiter-based.

As illustrated in FIG. 1, semantic tokens 122 may be leveraged by MMDS functionality 130 to facilitate retrieval of relevant application objects and data. In certain embodiments, MMDS functionality 130 may represent methods and systems for maintaining, interfacing, searching, and retrieving information from knowledge bases (e.g., data archives). MMDS functionality 130 may also encompass methods and systems for generating matching scores (e.g., 50%, 100%, etc.), which may be based on searching algorithms employed. MMDS functionality 130 may, in certain implementations, include semantic analysis processes, partial/fuzzy matching functionality, search result ranking, Boolean search processes, federated search processes, and/or attribute searching processes.

Interpretation functionality 140 may represent methods and systems for processing and analyzing MMDS results to determine user intent and resolve issues. Such intent may be discerned by, for example, applying configurable policies, applying location-, device-, and/or sensory-based context, and user dialoging. Interpretation systems and processes may resolve issues such as search result ambiguities, input deficiencies, imperfect conceptual matches, and compound commands. Interpretation functionality 140 may represent systems and methods for recognizing ambiguities; facilitating specification and management of configurable polices; maintaining context information; facilitating user dialogs; explicitly and/or implicitly learning; and personalizing policies, contexts, and learning on a per user basis. For example, as illustrated in FIG. 1, the token {sales} may relate to sales value and quantity and may therefore generate an ambiguity. To resolve such an ambiguity, a user dialog may be initiated to discern the user intent. In this fashion, true natural language interaction between user and system may be achieved. Interpreting systems and processes may yield one or more function and/or system calls, meta data elements, and master data elements, where the data may be used to populate the relevant function calls.

Actuation functionality 150 may represent methods and systems for translating interpretation results into single, compound, and/or sequences of system-actionable commands, queries, and/or function calls. Actuation may, in certain embodiments, encompass transmitting requests to various system components and interfacing with users based on received results. For example, actuation may include providing relevant information to a user.

The foregoing discussion is intended to introduce and provide initial clarity for some of the aspects associated with the present invention by referring to the exemplary functional blocks depicted in FIG. 1. Further details of the illustrated functionality as well as additional aspects, features, and embodiments of the present invention will be described in the following description.

Figure 2:
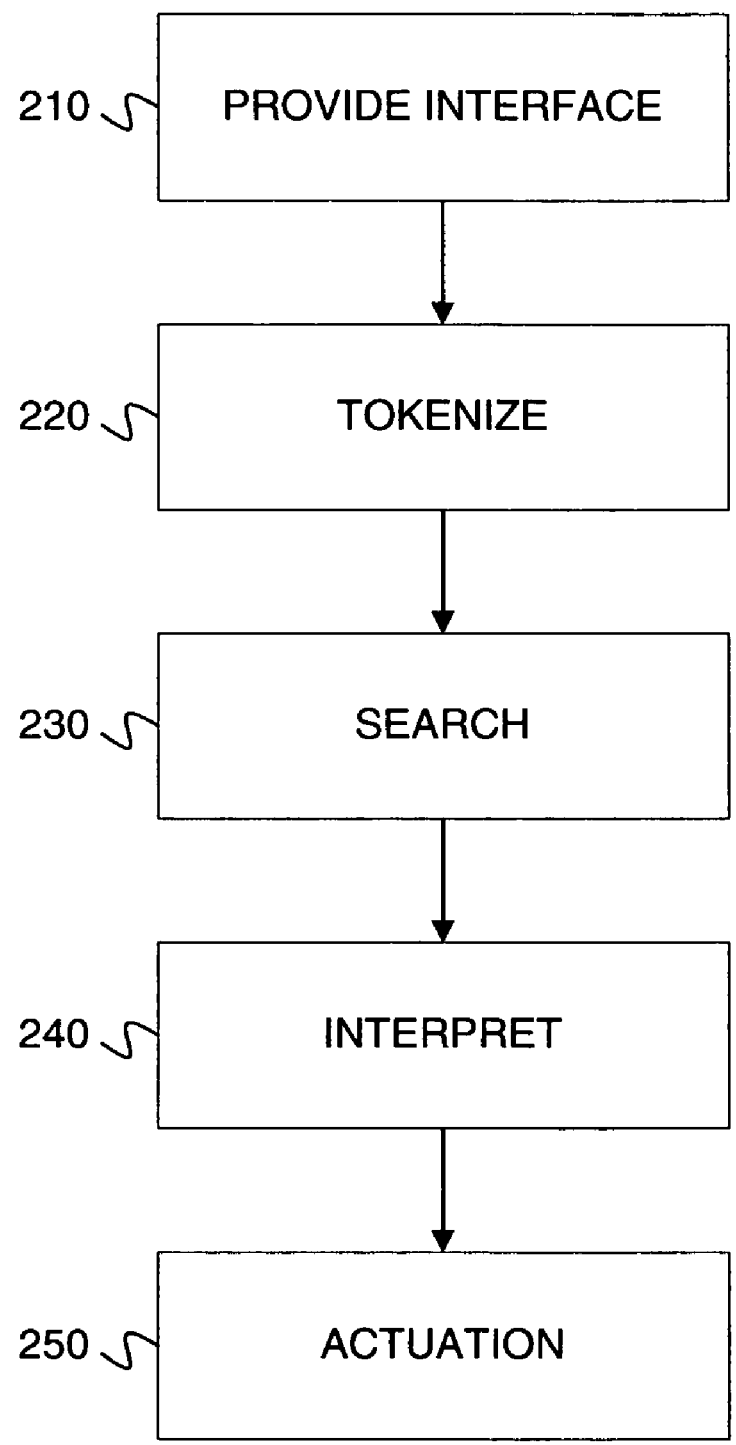
FIG. 2 is a flowchart depicting stages of a method consistent with certain embodiments of the present invention.

FIG. 2 is a flowchart depicting exemplary stages in a natural language processing method consistent with embodiments of the present invention. As illustrated, the method may include providing an interface (step 210), tokenizing (stage 220), searching (stage 230), interpreting (stage 240), and actuation (stage 250).

Interfacing

As illustrated, the method of FIG. 2 may include providing an interface (stage 210). In certain embodiments, providing an interface may encompass facilitating data exchange with one or more individuals, entities, applications and/or systems. In such embodiments, providing an interface may include providing an entry point through which queries can be input by and received from a user or system.

Consistent with embodiments of the present invention, a "query" may include a natural language query. As used herein, the term "natural language query" refers to any expression generated by one or more individuals, entities, and/or systems for the purpose of obtaining information from one or more knowledge bases. A natural language query may include, for example, optical information, audio information (e.g., voice signals), alphanumeric information, and/or symbolic information. An exemplary natural language query may be a textual expression that a user inputs to a computer system, such as "report on sales by Hamburg subsidiary." In certain embodiments, natural language queries may be contrary to conventional language format or syntax. For example, natural language queries could be slang, jargon, or in a specific dialect. Additionally or alternatively, natural language queries may include symbolic expressions. A particular natural language query may, in exemplary embodiments, comprise one or more "elements" or constituents, for example, each of the words in query 112. In one embodiment, a single natural language query may include a combination of different constituents, such as audible, textual, and optical constituents.

As used herein, the term "knowledge base" refers to any resource, facility, or lexicon, from which information can be obtained. In one example, a knowledge base may include one or more structured data archives distributed among one or more network-based data processing systems. A particular knowledge base may include information pertaining to any number of subjects. For example, a knowledge base may include numeric information, textual information, audible information, graphical information, etc. Additional details of an exemplary knowledge base consistent with embodiments of the present invention are discussed below in connection with FIG. 4.

In certain embodiments of the present invention, providing an interface may include interfacing one or more computer-based applications to facilitate information exchange with users of such applications. In such embodiments, providing an interface may involve embedding natural language processing functionality within one or more computer applications running on one or more data processing systems. In this fashion, users of such applications may input natural language queries and access natural language processing features. For example, providing an interface may include embedding one or more interface elements (e.g., GUI elements) within an application (e.g., Web browser) in order to receive natural language queries from, and facilitate ongoing communications with, users of the application. Additional details of exemplary applications as well as embedded interface elements are discussed below in connection with FIG. 4.

In one implementation, providing an interface may include leveraging one or more information capture devices that are configured to receive information from users. Providing an interface may therefore include interfacing one or more information capture devices, such as video capture devices, audio capture devices, optical scanning devices, and data reading devices. In one embodiment, providing an interface may include interfacing one or more voice portals, which may include software and hardware for receiving and processing queries from users via audible signals. Additional features and aspects of information capture devices and voice portals are discussed below in connection with FIG. 3.

In certain embodiments, queries may be obtained from one or more systems, with or without user intervention. For example, pre-recorded queries may be obtained from recording devices. In another example, a computer system may be configured to generate natural language queries for one or more users. Accordingly, obtaining queries may involve establishing a connection with such systems.

In one embodiment of the present invention, providing an interface may include prompting a user or system to enter information and/or providing notifications to users and systems. In one example, a user may be prompted or cued to input a natural language description via a particular input device. Users may be prompted or cued to input information by way of a textual and/or graphical message or image displayed on a computer monitor. In one implementation, prompting may include embedding interface elements within a computer application that prompt users for information. Prompting could also involve presenting audible cues to the user via an audio output device (e.g., a speaker).

Tokenizing

Consistent with embodiments of the present invention, methods of the present invention may tokenize received queries (stage 220). As used herein, the term "tokenize" refers to extracting conceptual components and/or removing certain query constituents in order to prepare the query for processing. In certain embodiments of the present invention, each of the discrete descriptive elements included in a particular query may be extricated or separated. In addition, tokenizing may involve deleting, adding, and/or converting certain descriptive elements (e.g., stop words) as necessary. For example, the descriptive elements a, on, by, and/or the may be deleted from a query due to their ubiquity.

Tokenizing processes consistent with embodiments of the present invention may transform received natural language expressions into one or more sets of semantic tokens (i.e., combinations of individual words and/or phrases). Each semantic token may, in one configuration, have an associated match element. In certain embodiments, any given natural language expression may be transformed into one or more of the following exemplary tokens: alphabetical tokens, numeric tokens, alphanumeric tokens, symbolic tokens, and delimiter tokens.

An alphabetical token may include one or more members of the Unicode Latin character set. Two or more words matching the input exactly combine to make one token including the white space between them.

Numeric tokens may be used when the query includes numeric elements. Such numeric elements may be tokenized as strings. In one embodiment, numbers may be tokenized a strings subject to certain restrictions. For example, numbers may be tokenized as strings unless they include certain elements such as a plus (+), minus (−), period (.), and/or comma (,). A matching element may be used to evaluate the numeric element in the query based on locale. Non-limiting examples of valid numeric elements include: 34; 3.45; 34.5; 3,456.78; 3.4.5. and 23,4444,56.

Alphanumeric tokens may be used when a query includes one or more letter-number combinations (e.g., mp3, 42nd. etc.) Such alphanumeric combinations may be tokenized by delimiters. A matching element may evaluate the token composition to determine if it is a proper ordinal or exact match.

Symbolic tokens may include one or more symbols and characters that are not alphabetical, numeric, or white space. Each individual token may be separate token. For example, (*) is three tokens: {(}, {*}, and {)}.

Delimiters may include symbols used between tokens, such as space, tabs, pauses, white noise, black space, etc. Wherever with space appears, for example, a token may end. An exception may occur when an exact match combines two or more alpha characters into one token including the white space. Non-limiting examples include the following:

"abc" is one token: {abc};

"a b c" is three tokens: {a}, {b}, and {c};

"$45 million" is three tokens: {$}, {45}, and {million}; and

"$45,000,000" is two tokens: {$} and {45,000,000}.

In certain embodiments of the present invention, tokenizing processes may be implemented by a tokenizer module. Such a tokenizer module may include any system, device, and/or facility capable of performing the above-mentioned tokenizing processes. Details of one exemplary tokenizer module are discussed below in connection with FIG. 3.

Searching

Consistent with embodiments of the present invention, methods may be provided for searching a knowledge base for information based on tokenized natural language queries (stage 230). In certain embodiments of the present invention, systems and methods may maintain a searchable data index of meta data and master data associated with one or more knowledge bases that may be available and potentially relevant to received queries. Such a data index may include meta data elements, master data elements, system elements, and/or descriptions thereof.

As used herein, the term "meta data" refers to information reflective of master data elements. For example, a particular master data element (e.g., a document) may be associated with the following meta data: document source, document contributors, document date, document location (e.g., URL, filename, etc.), document type, document status, document subject matter, etc. In certain embodiments, a plurality of meta data elements of a given type may be associated with a single master data element. For example, a given document may be associated with meta data element name="X" in one knowledge base, while that same document is associated with meta data element name="Y" in another knowledge base.

In one implementation, elements of an information system or references to such elements may be included in the data index. Exemplary system elements may include menu items, icons, images, hyperlinks, system actions, and action symbols. In certain embodiments, the data index may include descriptions of functional elements associated with one or more information systems and/or applications, such as Application Program Interfaces (APIs), code objects, etc.

The searchable index may, in certain embodiments, include technical addresses or identifiers associated with the meta data, master data, and functional elements. Such identifiers may indicate locations of the data and elements within one or more knowledge bases.

In certain embodiments of the present invention, the data index may be generated via explicit training and/or feedback. Explicit training may involve using known examples or cases to associate meta data with master data. For example, explicit training may involve loading pre-configured meta data and master data into the index. In addition, the data index may be dynamically established and/or updated using information obtained from a user. Additional details of an exemplary data index are discussed below in connection with FIG. 3.

Consistent with embodiments of the present invention, searching (stage 230) may include searching the data index for information using the semantic tokens derived from the natural language query. In certain embodiments, searching may include analyzing semantic tokens to identify relevant terms that are semantically related to the semantic tokens, such as synonyms, hypernyms, etc. Items having such semantic relationships with tokens may be added as supplements to the original tokens and searched in the data index.

Searching the index may, in certain embodiments, involve one or more algorithms and/or techniques, such as exact matching, fuzzy matching, phonetically-based fuzzy matching, attribute-based searching, federated searching, and Boolean searching.

In certain implementation of the present invention, searching (stage 230) may include generating and/or identifying one or more addresses associated with elements in the data index found using the semantic tokens. Searching may also include identifying and/or retrieving identifiers (e.g., field names), and descriptions associated with meta and master data elements.

In one embodiment of the present invention, searching (stage 230) may include prioritizing information found in the data index With respect to the semantic tokens. In one example, prioritizing may be performed via matching scores. Each match score may represent a qualitative and/or quantitative weight or bias indicating the strength/correlation of the association between elements in the data index and the semantic tokens. A given match score may be based on the various matching techniques employed to retrieve its corresponding data element. In one embodiment, each score may be initialized with equal nominal values and subsequently increased using feedback obtained from users.

The match scores may, in one configuration, indicate a cumulative value including the weights for each association between data elements and semantic tokens. For example, the token {agenda} may have an association (weight=3) with a data file containing a television programming schedule (element A referenced in the data index) and an association (weight=4) with a different data file containing a corporate business meeting schedule (element B referenced in the data index). In addition, the token {TV} may have an association (weight=7) with the television programming schedule (element A) and an association (weight=1) with the corporate meeting schedule (element B). Accordingly, if the user inputs the description "TV agenda," assuming the tokens {Tv} and {agenda} are found in the data index, element A may be given a score of (3+7)=10 and element B may be given a score of (4+1)=5. Since the data file containing the television programming information (element A) is scored higher, it may be ranked or classified as having more relevance to the semantic tokens.

In certain embodiments of the present invention, searching processes may be implemented by an MMDS module. Such a module may include any system, network, device, and/or facility capable of performing the above-mentioned searching processes. Details of one exemplary MMDS module are discussed below in connection with FIG. 3.

Interpreting

Consistent with embodiments of the present invention, search results may be further processed or interpreted in order to resolve uncertainties (stage 240). As used herein, the term "uncertainty" may encompass various issues/challenges pertaining to the relationship between information found in the data index and the actual intent of the user behind a given natural language query. Interpreting may include determining user intent with respect to a query in order to resolve uncertainties. Uncertainties may include, for example, ambiguities, input deficiencies, imperfect conceptual matches, and compound commands.

Ambiguities may arise when a given semantic token appears with equal match strength in multiple areas within the data index and/or across multiple element types within the data index. For example, the semantic token {sales}, illustrated in FIG. 1, may have equal match strength (e.g., 50%) with respect to a "sales value" area and a "sales quantity" area within the data index. In one embodiment, match strength may be discerned from the above-mentioned match scores. Since the token {sales} potentially relates to more than one area within the data index, information regarding the user intent may be required to ensure the user is provided with relevant information.

Input deficiencies may arise when a given natural language query is insufficient to retrieve information from the data index or insufficient to carry out the requested action.

Imperfect conceptual matches may arise when a plurality of conceptually similar data elements within the data index relate to a semantic token. For example, a conference room available Tuesday at 10:00 am is conceptually similar to a room with the same availability without a projector. When an imperfect conceptual match occurs, information regarding the user intent may be required.

Compound commands may arise when a user inputs a series of dependent commands in a single natural language query. In such a case, information regarding user intent may be required in order to determine the proper sequence for the actuation of the commands.

Examples of uncertainties are presented in FIG. 6. In certain embodiments, interpreting (stage 240) may include recognizing uncertainties with respect to information in the data index and natural language queries, recognizing that user intent is required, and recognizing a particular solution for resolving the uncertainty (i.e., obtaining the intent).

Consistent with embodiments of the present invention, uncertainties may be resolved by way of user dialoging, configurable policies, context awareness, explicit and implicit training, and learning on a per user basis.

User dialoging may involve acquiring information from a user subsequent to that user inputting a natural language description. In certain embodiments, user dialoging may involve notifying the user of an uncertainty (e.g., via a user interface coupled to a computer system) and presenting various options/queries to the user to determine intent. For example, referring to FIG. 1, a user may be prompted to select between sales value and sales quantity.

In one embodiment, configurable polices may be specified, managed, and leveraged to resolve uncertainties. For example, one or more preset rules may be applied in order to resolve uncertainties. Such rules may include "if . . . , then . . ." guidelines. Policies may be pre-configured and/or dynamically configured through user interaction. In addition, policies may personalized and updated through explicit and/or implicit learning.

Context awareness may also be leveraged to resolve uncertainties. Such context awareness may be based, for example, on device types associated with a user, where the user is within a chain of interactions, and sensor data (e.g., location, temperature, etc.). For example, the user may input the query "weather in Mechanicsville," which may generate the following tokens: {weather} and {Mechanicsville}. In such a case, however, {Mechanicsville} may relate to a town located in two different countries. To resolve the uncertainty, an awareness of the user's geographic location may leveraged to select one of the countries.

In certain embodiments, context awareness may be achieved dynamically through user interaction. In addition, contexts may be learned (e.g., via explicit and/or implicit training) on a per user basis. Further, certain contexts may be interchangeable, and contexts may be switched as needed.

Consistent with embodiments of the present invention, interpreting methods may include generating/identifying one or more winning combinations of elements from the data index. By determining user intent, interpreting methods may filter information actually relevant to the user's query. That is, interpreting methods may distill the information obtained from a search (stage 230) down to information that is relevant to the query and in accordance with the user's intent. The interpreted information (i.e., winning combination of elements) may include function calls, meta data, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

In certain embodiments of the present invention, interpretation processes may be implemented by an interpretation module. Such a module may include any system, network, device, and/or facility capable of performing the above-mentioned interpretation processes. Details of one exemplary interpretation module are discussed below in connection with FIG. 3.

Actuation

After a natural language query is tokenized and the search results obtained from the tokens are interpreted, the interpreted data (i.e., winning combinations) may be actuated (stage 250). In certain embodiments, actuating may include translating interpreted information into one or more system-actionable commands, queries, and or function calls. Actuating may include creating commands, creating ad-hoc workflows or business processes, and/or executing commands. Actuating may also include sending requests to one or more systems, networks, and/or devices. In one example, actuating may include sending requests using APIs such as SQL (Structured Query Language), Web Services, RMI, RFCs (Remote Function Calls), BAPIs (Business Application Programming Interfaces), etc. Actuating may include generating one or more displays/presentations for the user based on responses to such requests. In certain embodiments, actuating may include providing the interpreted information to the user. Providing users with information may include, but is not limited to, providing access to system entities, routing the user to system entities, and/or presenting elements to the users. In one example, interpreted information may be provided to a user audibly and/or visually.

In exemplary embodiments, interpreted information elements may be arranged according to their respective scores, as computed in the manner discussed above. Further, elements with higher match scores may be visually or audibly accentuated to distinguish then from other presented elements.

In certain embodiments of the present invention, actuation processes may be implemented by an actuation module. Such a module may include any system, network, device, and/or facility capable of performing the above-mentioned actuation processes. Details of one exemplary actuation module are discussed below in connection with FIG. 3.

The steps illustrated in the flowchart of FIG. 2 are consistent with exemplary implementations of the instant invention. Further, it should be understood that the sequence of events described in FIG. 2 are exemplary and not intended to be limiting. Thus, other method steps may be used, and even with the method depicted in FIG. 2, the particular order of events may vary without departing from the scope of the present invention. Moreover, processes associated with certain illustrated steps may occur simultaneously. For example, interpretation processes (stage 240) may occur simultaneously with certain searching processes (stage 230). For instance, while searching processes execute, one or more interpretation processes may be invoked to resolve uncertainties dynamically. Moreover, certain steps may not be present and additional steps may be implemented in FIG. 2.

Exemplary System

Figure 3:
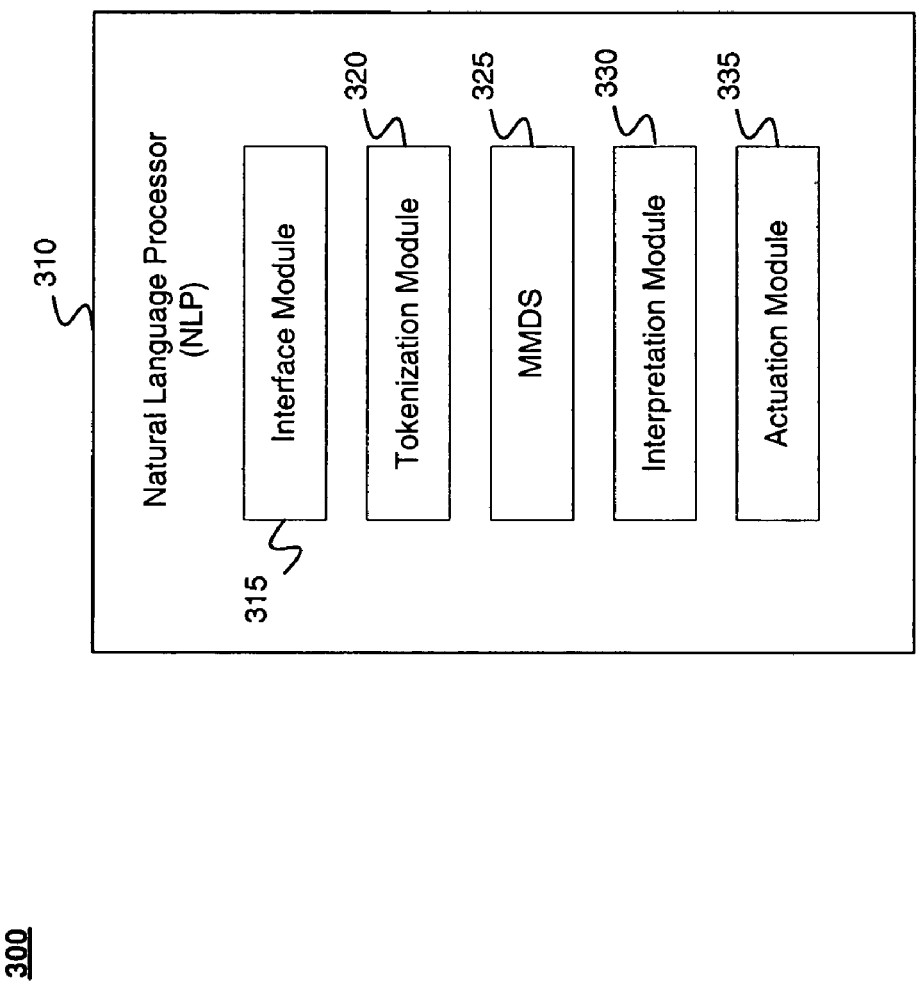
FIG. 3 is an exemplary block diagram of a system in which features and aspects consistent with certain embodiments of the present invention may be implemented.

FIG. 3 is a block diagram of a system 300, in which features and aspects consistent with the present invention may be implemented. The number of components in system 300 is not limited to what is shown and other variations in the number of arrangements of components are possible, consistent with embodiments of the invention. The components of FIG. 3 may be implemented through hardware, software, and/or firmware. As illustrated, system 300 may comprise a Natural Language Processor (NLP) 310, an information capture device 375, and a knowledge base 350.

NLP 310 may include any device, mechanism, system, network, and/or compilation of instructions for performing natural language query processing functionality consistent with the present invention. In the configuration illustrated in FIG. 3, NLP 310 may include an interface module 315, a tokenization module 320, an MMDS module 325, and interpretation module 330, and an actuation module 335. In certain embodiments, module 315, 320, 325, 330, and 335 may each be implemented via any combination of hardware, software, and/or firmware. Modules 315, 320, 325, 330, and 335 may, in at least one example, include functional logic corresponding to functionalities 110, 120, 130, 140 and 150, of FIG. 1, respectively.

Interface module 315 may serve as entry point or user interface through which one or more users can input natural language queries. In certain embodiments, interface module 315 may facilitate information exchange among and between NLP 310 and one or more users and/or systems. Interface module 315 may be implemented by one or more software, hardware, and/or firmware components. Interface module 315 may include one or more logical components, processes, algorithms, systems, applications, and/or networks. Certain functions embodied by interface module 315 may be implemented by, for example, HTML, HTML with JavaScript, C/C++, Java, etc. Interface module 315 may include or be coupled to one or more data ports for transmitting and receiving data from one or more components coupled to NLP 310. Interface module 315 may include or be coupled to one or more user interfaces (e.g., a GUI).

In certain configurations, interface module 315 may interact with one or more applications running on one or more computer systems. Interface module 315 may, for example, embed functionality associated with components of NLP 310 into applications running on a computer system. In one example, interface module 315 may embed NLP 310 functionality into a Web browser or interactive menu application with which a user interacts. For instance, interface module may embed GUI elements (e.g., dialog boxes, input fields, textual messages, etc.) associated with NLP 310 functionality in an application with which a user interacts. Details of applications with which interface module 315 may interact are discussed below in connection with FIG. 4 (419).

In certain configurations, interface module 315 may facilitate on-going communication with users of NLP 310. Additionally, interface module 315 may be configured to provide dialog and/or hint boxes as well as spellchecker and thesaurus features to users as they interact with applications that communicate with NLP 310. In one configuration, interface module 315 could provide auto completion services for users as they input queries. Such services may leverage previous entries/queries received from the user inputting the request and/or other previous users.

In certain embodiments, interface module 315 may include, be coupled to, and/or integrate one or more systems and/or applications, such as speech recognition facilities and Text-To-Speech (TTS) engines. Further, interface module 315 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface module 315 may serve as an intermediary between other modules within NLP 310 and a user. In one embodiment, interface module 315 may receive requests/instructions from interpretation module 330, initiate communication with the user, and relay information input by the user back to interpretation module 330. For example, user interface 315 may facilitate user dialoging to enable interpretation module 330 to perform certain operations. In one implementation, interface module 315 may monitor and/or retrieve status information associated with users of NLP 310 and relay such information to interpretation module 330.

In certain embodiments of the present invention, interface module 315 may provide personalization features and include profiles associated with users and systems. For example, interface 315 may establish and maintain a profile for each user that interacts with NLP 310. In one configuration, interface module 315 may leverage one or more user profiles to provide auto completion services.

Consistent with embodiments of the present invention, interface module 315 may receive natural language queries from a User and forward the queries to tokenization module 320.

Tokenization module 320 may transform natural language queries into semantic tokens. Tokenization module 320 may be implemented by one or more software, hardware, and/or firmware components. Tokenization module 315 may include one or more logical components, processes, algorithms, systems, applications, and/or networks. Tokenization module 320 may include stemming logic, combinatorial intelligence, and/or logic for combining different tokenizers for different languages. In one configuration, tokenization module 320 could receive an ASCII string and output a list of words. Tokenization module 320 may transmit generated tokens to MMDS module 325 via standard machine-readable formats, such as the expendable Markup Language (XML).

MMDS module 325 may be configured to retrieve information using tokens received from tokenization module 320. MMOS module 325 may be implemented by one or more software, hardware, and/or firmware components. MMDS module 325 may include one or more logical components, processes, algorithms, systems, applications, and/or networks. In one configuration, MMDS module 325 may include an API, a searching framework, one or more applications, and one or more search engines.

MMDS 325 may include an API, which facilitates requests to one or more operating systems and/or applications included in or coupled to MMDS module 325. For example, the API may facilitate interaction between MMDS 325 and one or more structured data archives (e.g., knowledge base 350).

In one configuration, MMDS 325 may include an API that is exposed to one or more business intelligence systems, such as a Business Warehouse (BW). Such business intelligence systems may include or be based on a data warehouse optimized for environments such as the R/3 environment from SAP. These business intelligence systems may include various databases, systems, and tools. For example, business intelligence systems may include reporting tools, modeling processes, APIs (e.g., BAPIs), one or more OLAP processors, data extraction and loading routines, data field indexers, and one or more metadata repositories. MMDS 325 may leverage and/or interact with one or more tools included in the business intelligence systems.

In certain embodiments, MMDS module 325 may be configured to maintain a searchable data index, including meta data, master data, meta data descriptions, and/or system element descriptions. For example, the data index may include readable field names (e.g., textual) for meta data (i.e., table names and column headers); master data (i.e., individual field values), and meta data descriptions. The data index may be implemented via one or more hardware, software, and/or firmware components. In one implementation, a searching framework within MMDS 325 may initialize the data index, perform delta indexing, collect meta data, collect master data, and administer indexing. Such a searching framework may be included in one or more business intelligence applications (e.g., a BW).

In certain configurations, MMDS module 325 may include or be coupled to a low level semantic analyzer, which may be embodied by one or more software, hardware, and/or firmware components. The semantic analyzer may include components for receiving tokens from tokenization module 320 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens. In one embodiment, the semantic analyzer may be included in the business intelligence systems (e.g., BW).

Consistent with embodiments of the present invention, MMDS module 325 may leverage various components and searching techniques/algorithms to search the data index using tokens received by tokenization module 320. MMDS module 325 may leverage one or more search engines that employ partial/fuzzy matching processes and/or one or more Boolean, federated, or attribute searching components.

In certain configurations, MMDS module 325 may include and/or leverage one or more information validation processes. In one configuration, MMDS module 325 may leverage one or more languages for validating XML information, such as Tree Regular Expressions (TREX). MMDS module 325 may include or be coupled to one or more TREX-based clients that include business application subsystems (e.g., the SAP/R3 system). Such business application subsystems may be developed using ABAP or any other program development language.

In certain configurations, MMDS module 325 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

In one configuration, MMDS module 325 may include one or more learning components to enhance searching efficiency. In one example, such a learning component may observe and/or log information requested by users and may build additional and/or prioritized indexes for fast access to frequently requested data. Learning components may exclude frequently requested information from the data index, and such MMDS data may be forwarded to and/or included in interpretation module 330.

MMDS module 325 may output to interpretation module 330 a series of meta and/or master data technical addresses, associated field names, and any associated description fields. MMDS module 325 may also output matching scores to interpretation module 330.

Interpretation module 330 may process and analyze results returned by MMDS module 325. Interpretation module 330 may be implemented by one or more software, hardware, and/or firmware components. Interpretation module 315 may include one or more logical components, processes, algorithms, systems, applications, and/or networks. In one example, interpretation module 315 may include an agent network, in which agents make claims by matching policy conditions against tokenized natural language queries and context information. Interpretation module 330 may, for example, include an agent network provided by Dejima.

Consistent with embodiments of the present invention, interpretation module 330 may be configured to recognize uncertainties associated with information identified by MMDS 325. For example, interpretation module 330 may identify ambiguities, input deficiencies, imperfect conceptual matches, and compound commands. In certain configurations, interpretation module 330 may initiate, configure, and manage user dialogs; specify and manage configurable policies; perform context awareness processes; maintain context information; personalize policies and perform context switches; and perform learning processes.

Interpretation module 330 may be configured to interact with interface module 315 in order to resolve uncertainties. For instance, upon identifying an uncertainty, interpretation module 330 may initiate a dialog with a user via interface module 315. To facilitate such a dialog, interface module 330 may, for example, leverage one or more GUIs.

In operation, interpretation module 330 may interact with one or more other modules within NLP 310. In one example, interpretation module 330 may dynamically interact with MMDS module 325 (e.g., as searches are performed) in order to resolve uncertainties as they arise.

Interpretation module 330 may provide one or more winning combinations of data elements to actuation module 335. Interpretation module 330 may filter information identified by MMDS module 330 in order to extract information that is actually relevant to a user's query. That is, interpretation module 330 may distill information identified by MMDS module 325 down to information that is relevant to the query and in accordance with user intent. Information provided by interpretation module 330 (i.e., winning combination of elements) may include function calls, meta data, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuation module 335 may process interpreted information provided by interpretation module 330. Actuation module 335 may be implemented by one or more software, hardware, and/or firmware components. Actuation module 335 may include one or more logical components, processes, algorithms, systems, applications, and/or networks. Actuation module 335 may be configurable to interact with one or more system environments.

Consistent with embodiments of the present invention, actuation module 335 may be configured to provide information to one or more users/systems. In such embodiments, actuation module may interact with one or more information display devices. Exemplary display devices are discussed below in connection with FIG. 4.

In certain embodiments, actuation module 335 may be configured to send requests to one or more devices and/or systems using, for example, various APIs (e.g., SQL, Web Services, RMI, RFCs, BAPIS. etc.). Actuation module 335 may generate one or more presentations based on responses to such commands.

For clarity of explanation, interface module 315, tokenization module 320, MMDS module 325, interpretation module 330, and actuation module 335 are described as discrete functional elements within NLP 310. However, it should be understood that the functionality of these elements and modules may overlap and/or may exist in fewer elements and modules. Moreover, all or part of the functionality of these elements may co-exist or be distributed among several geographically-dispersed locations.

Tools and Maintenance

Consistent with embodiments of the present invention, one or more tools for managing and maintaining NLP 310 may be provided. Such tools may include, for example, a corpus generator, a corpus maintenance tool, an MMDS testing environment, an integration module development environment, a design-time integration module testing environment, and a run-time integration module maintenance environment.

The corpus generator may provide partial automation of corpus/synonym generation and collection. As used herein, the term "corpus" refers to a compilation of data associated with a particular application and/or user. Consistent with principles of the instant invention, a corpus may be defined for each user or environment. A corpus may include language preference data, specific description-entity associations, and other user/system specific information. In certain embodiments, corpus maintenance tools may provide a graphical environment in which corpora may be maintained and/or modified during run time.

The MMDS testing environment may automatically generate test tokens based on data index content and submit these test tokens to MMDS module 325. Results may be documented and presented to an administrator.

The integration module development environment may support generation of and modification of policies associated with integration module 330. The environment may also provide functionality for modifying integration module sensitivities with respect to context information. The environment may also support user dialogs and may enable modifications of circumstances that result in the triggering of a dialog with a user. In addition, the environment may enable specification of elements available for implicit and explicit learning, and the environment may enable configuration of how such learning is to be executed.

The design-time integration module testing environment may test integration module 330 post-development in order to identify one or more likely problem areas. In one example, random tokens may be submitted to integration module 330 based on the content of the MMDS data index.

The run-time integration module maintenance environment may log user interactions with NLP 310. The environment may provide alerts when errors relating to specific user inputs exceed a configurable threshold. For such error scenarios, the environment may infer user intent based on the end state of the application after the error occurs. In certain configurations, the maintenance environment may enable run-time modification of policies and rules associated with integration module 330.

Exemplary Environment

Figure 4:
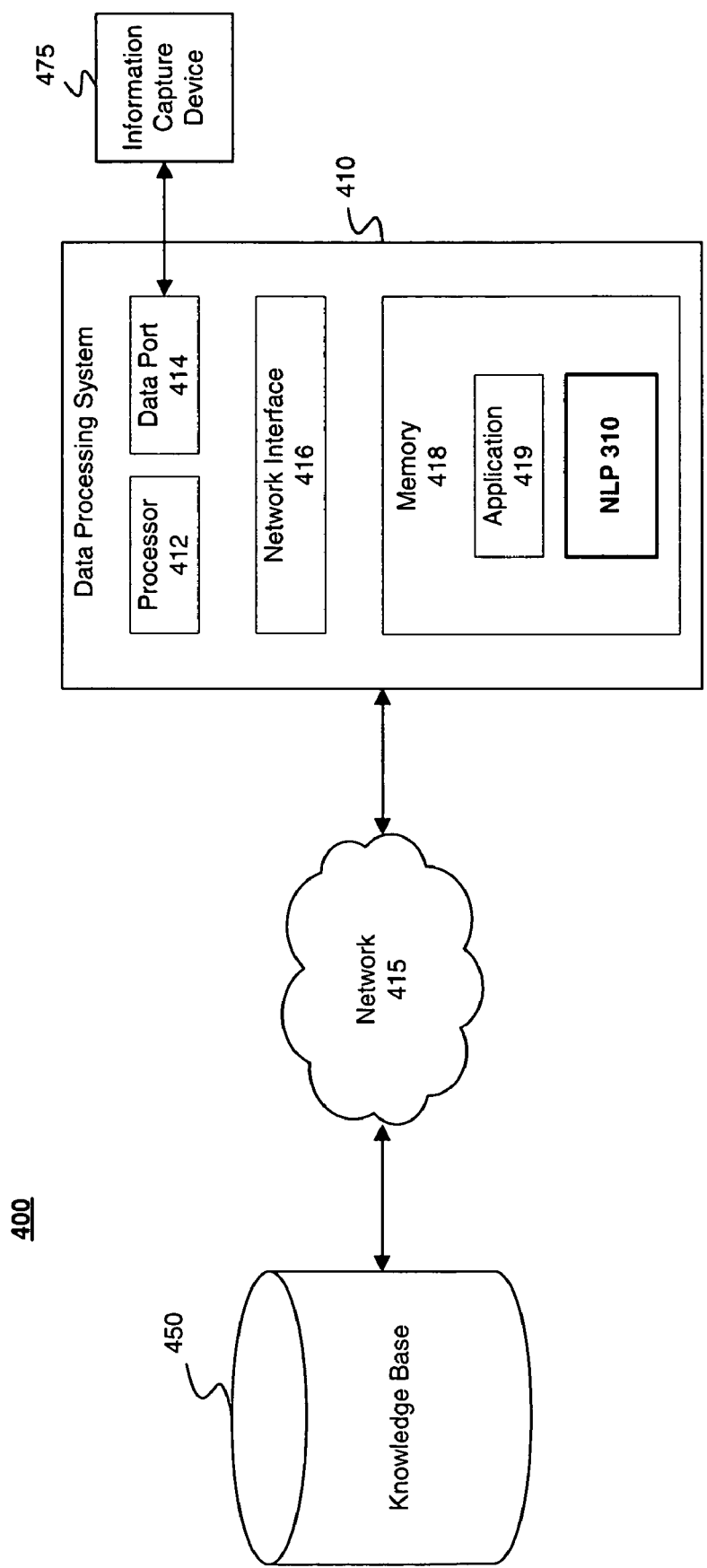
FIG. 4 is an exemplary block diagram of an environment in which certain elements consistent with embodiments of the present invention may be implemented.

In one particular configuration of the present invention, NLP 310 (and its associated tools) may be implemented in a data processing environment 400, which is depicted in FIG. 4. The number of components in environment 400 is not limited to what is shown and other variations in the number of arrangements of components are possible, consistent with embodiments of the invention. As illustrated in FIG. 4, environment 400 may include a data processing system 410, a network 415, and knowledge base 450.

Network 415 may be the Internet, a virtual private network, a local area network, a wide area network, a broadband digital network or any other structure for enabling communication between two or more nodes or locations. Network 415 may include a shared, public, or private data network and encompass a wide area or local area. Network 415 may include one or more wired and/or wireless connections. Network 415 may employ communication protocols such as Transmission Control and Internet Protocol (TCP/IP), Asynchronous Transfer Mode (ATM), Ethernet, or any other compilation of procedures for controlling communications among network locations. In certain embodiments, network 415 may also include and/or provide telephony services. In such embodiments, network 415 may be include and/or leverage a Public Switched Telephone Network ("PSTN"). Alternatively, network 415 may leverage voice-over Internet Protocol ("VoIP") technology. In certain implementations, network 415 may include and/or leverage PSTN and VoIP technology.

Various components within environment 400 may be operatively connected to network 415 by communication devices and software known in the art, such as those commonly employed by Internet Service Providers (ISPs) or as part of an Internet gateway. Such components may be assigned network identifiers (ID). As used herein, the term "ID" refers to any symbol, value, tag, or identifier used for addressing, identifying, relating, or referencing a particular element. Network IDs, for example, may include IP addresses.

Data processing system 410 may, in certain embodiments, represent a server system or a personal computer system. As illustrated in FIG. 4, data processing system 410 may comprise a network interface 416, a processor 412, a data port 414, and a memory 418. Data processing system 410 may comprise additional and/or fewer components, and one or more of the components implanted in data processing system 410 may be scalable in order to accommodate additional services, data, and/or users.

Data processing system 410 may be connected to network 415 via network interface 416 which may be operatively connected via a wired and/or wireless communications link. Network interface 416 may be any mechanism for sending information to and receiving information from network 415, such as a network card and an Ethernet port, or to any other network such as an attached Ethernet LAN, serial line, etc. In one configuration, network interface 416 may allow data processing system 410 to interact with several clients as well as the Internet.

Memory 418 may include any system and/or mechanism capable of storing information. Memory 418 may be embodied with a variety of components and/or subsystems, including a random access memory ("RAM"), a read-only memory ("ROM"), magnetic and optical storage elements, organic storage elements, audio disks, and video disks. Memory 418 may provide a primary memory for processor 412, such as for program code. Memory 418 may, for example, include program code for TCP/IP communications; kernel and device drivers; configuration information, such as a Dynamic Host Configuration Protocol (DHCP) configuration, and other application that might be installed on data processing system 410. Although a single memory is shown, any number of memory devices may be included in data processing system 410, and each may be configured for performing distinct functions. Consistent with embodiments of the present invention, memory 418 may contain one or more of the components included in system 300. In one configuration, memory 418 may include NLP 310.

As illustrated in FIG. 4, memory 418 may also include an application 419, which may interact with one or more modules within NLP 310. Application 419 may include any type of program designed to perform a specific function for one or more users or other devices. Application 419 may represent, but is not limited to, one or more of a word processor, a database program, a business intelligence application, an internet, extranet, and/or intranet browser or website, a development tool, a scheduling tool, a routing tool, a communication tool, a menu interface, and an audio and/or video editing program. Application 419 may be a compilation of instructions for manipulating data written in any structural, procedural, object-oriented, or other type of programming language. As illustrated, application 419 may comprise a user interface such as a GUI for facilitating using interaction with the application.

Processor 412 in data processing system 410 may be operatively configured to execute instructions. Processor 412 may be configured for routing information among components and devices and for executing instructions from memory 418. Although FIG. 4 illustrates a single processor, data processing system 410 may include a plurality of general purpose processors and/or special purpose processors (e.g., ASICS). Processor 410 may also include, for example, one or more of the following: a co-processor, memory, registers, and other processing devices and systems as appropriate. Processor 410 may be implemented, for example, using a Pentium™ processor provided from Intel Corporation.

As illustrated, server 410 may comprise a data port 414, which may be operatively coupled to one or more information capture devices 475. In one configuration, data port 414 may transmit data serially or in parallel to information capture device 475. In certain embodiments, data port 414 may interact with application 419 and/or interface module 315 in order to receive information (e.g., natural language queries) from information capture device 475.

Information capture device 475 may include any device, mechanism, system, or network for receiving information from a source (e.g., a user). Information capture device 475 may include, for example, one or more audio and/or video capture devices (e.g., a microphone, camera. etc.). Information capture device 475 may additionally or alternatively represent a data reading device and/or an input device/port. In addition, information capture device 475 may include or be coupled to a voice portal and/or voice recognition software for recognizing and parsing inputted utterances. Such voice recognition software could reside in memory 418.

Knowledge base 450 may include any resource, facility, or lexicon, from which information can be obtained. Knowledge base 450 may be implemented by one or more software, hardware, and/or firmware elements. In one example, knowledge base 450 may represent one or more structured data archives distributed among one or more network-based data processing systems. Knowledge base 450 may include one or more relational databases, distributed databases, object-oriented programming databases, and/or any other mechanism, device, or structure for managing, accessing, and updating an aggregation of data. Knowledge base 450 may include, for example, numeric information, textual information, audible information, graphical information, etc.

As mentioned above, data processing system 410 may comprise additional and/or fewer components that what is shown in FIG. 4, and one or more of the components implanted in data processing system 410 may be scalable in order to accommodate additional services, data, and/or users. For example, in certain configurations (e.g., when representing a personal computer), data processing system 410 may include one or more-components included in client 510 (e.g., output device 524, storage module 528, etc.) discussed below in connection with FIG. 5.

In operation, a user may access NLP 310 via data processing system 410. In one example, a user may access NLP 310 directly from data processing system 410. For example, data processing system 410 may include a personal computer coupled to the Internet. In other embodiments, data processing system 410 may include a server system, and users/systems may access NLP 310 located in the server system by way of a remotely-located client device. Moreover, in alternative embodiments, NLP 310 could be implemented in a client device, rendering a server system unnecessary. In addition, NLP 310 may be distributed among one or more server systems and client devices. An exemplary client device 510 is illustrated in FIG. 5.

Figure 5:
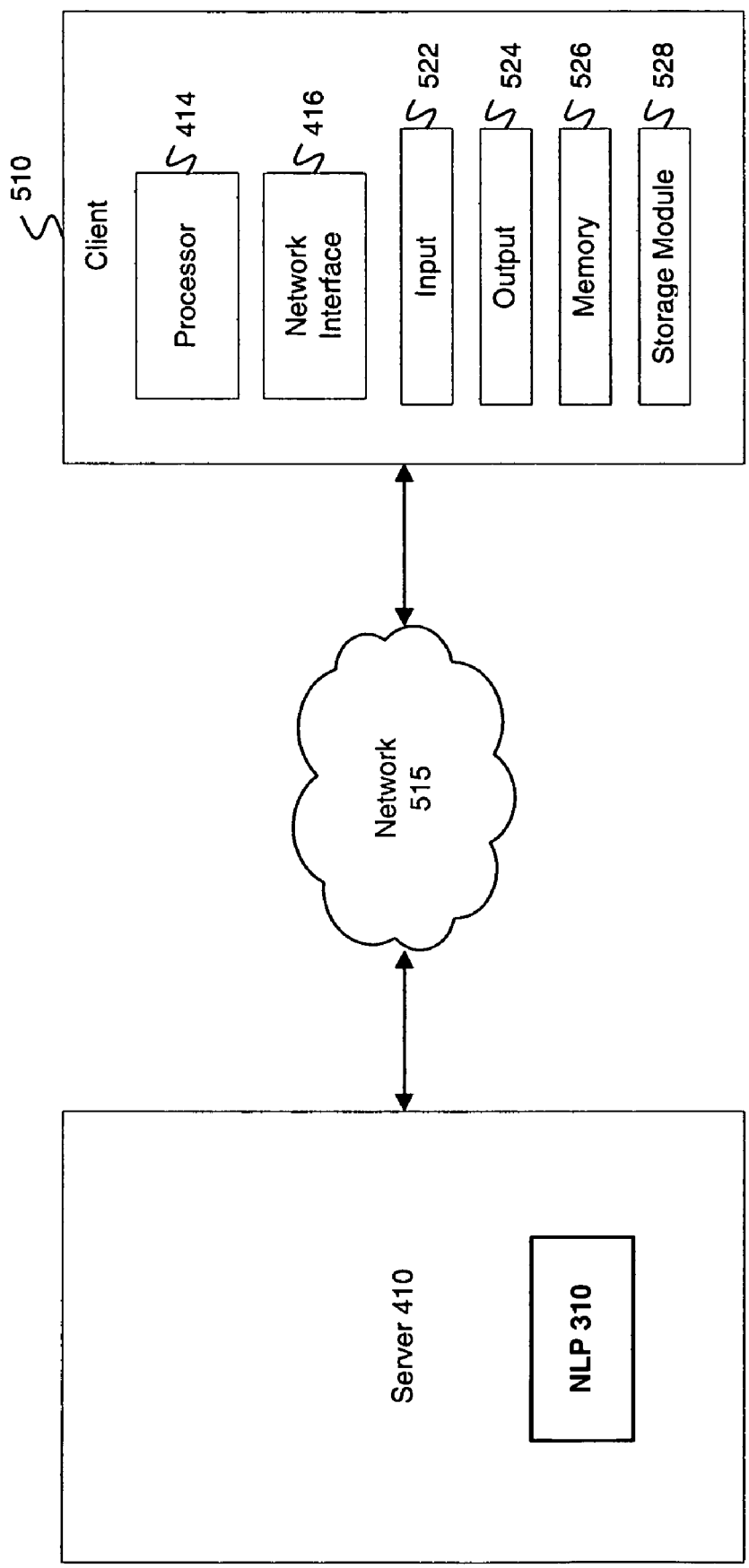
FIG. 5 is an exemplary block diagram of an environment in which certain elements consistent with embodiments of the present invention may be implemented.

FIG. 5 illustrates an exemplary environment 500, in which methods and systems of the present invention may be implemented consistent with certain embodiments. Environment 500 may include data processing system 410 (e.g., a server); network 515, which may similar to network 415; and a client 510. In environment 500, NLP 310 may be implemented in data processing system 410.

In one configuration, client 510 may include components similar to those included in data processing system 410, such as processor 414 and network interface 416. Client 510 may, however, be structurally different from data processing system 410 and may have varying or additional components. Client 510 may be a personal computer, mobile computing device (e.g., a PDA), mobile communications device (e.g., a cell phone), or any other structure that enables a user to remotely access information from data processing system 410 and/or network 405. In alternative embodiments, client 510 could be a kiosk or "dumb" terminal coupled to data processing system 410. In one exemplary implementation, client 510 may comprise or be coupled to an input device 522, an output device 524, a memory 526, and a storage module 528.

Input device 522 may include at least one button actuated by the user to input commands and thereby select from a plurality of processor operating modes. In one configuration, input device 522 may be similar to information capture device 475. Input device 522 may include components such as keyboard 125, a mouse, and/or a touch screen. Additionally, input device 522 could include one or more audio and/or video capture devices. For example, input device 522 may include a microphone to which a user can input audible utterances. Accordingly, input device 522 may include or be coupled to voice recognition software for recognizing and parsing inputted utterances. The voice recognition software could reside in memory 526. Input device 522 may additionally or alternatively include a data reading device and/or an input port.

Output device 524 may be configured to visually display text, images, or any other type of information by way of a cathode ray tube, liquid crystal, light-emitting diode, gas plasma, or other type of display mechanism. For example, output device 524 may be a computer monitor such as monitor 130. Output device 524 may additionally or alternatively be configured to audibly present information. For example, output device 524 could include an audio output device, such as a speaker, for outputting audible sounds to a user. Accordingly, output device 524 may include or be coupled to audio software configured to generate synthesized or pre-recorded human utterances. Such software could reside in memory 526 and be configured to interact with application interface 410. The audio software could, alternatively, be included in or coupled to application interface 410 itself. Output device 524 may be used in conjunction with input device 522 for allowing user interaction.

Memory 526 may be of similar structure to memory 418 in data processing system 410. Further, memory 526 may include one or more applications 419. However, in certain configurations, memory 526 may have less storage capacity than memory 418 in order to reduce cost and size. When client 510 executes an application installed in storage module 528, processor 412 may download at least a portion of program code from storage module 528 into memory 526. As processor 414 executes the program code, processor 414 may also retrieve additional portions of program code from storage module 528.

Storage module 528 may provide mass storage for client 510. Storage module 528 may be implemented with a variety of components or subsystems including, for example, a hard drive, an optical drive, CD ROM drive, DVD drive, a general-purpose storage device, a removable storage device, and/or other devices capable of storing information. Further, although storage module 528 is shown within client 510, storage module 528 may be implemented external to client 510.

Storage module 528 may include program code and information for client 510 to communicate with data processing system 410. Storage module 528 may include, for example, program code for various client applications and an Operating System (OS), such as the Windows Operation System provided by Microsoft Corporation. In addition, storage module 528 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on client 510.

Although FIG. 5 depicts NLP 310 residing entirely in data processing system 410, it should be understood that one or more of the components of NLP 310 may exist in or be distributed among one or more clients (e.g., 510), or other locations, coupled to network 515. For example, NLP 310 may reside in memory 526 of client 510.

It should also be understood that any number of geographically-dispersed clients may be included in system 500. In one configuration, each of a plurality of clients (510) may access NLP 310, which may reside on data processing system 410 or be distributed among data processing system 410 and one or more of the clients. In certain configurations, a plurality of applications running on a plurality of clients may access NLP 310 residing on data processing system 410. In certain embodiments of the present invention, each of the plurality of clients (510) may contain a replica or version of all or part of NLP 310 respectively.

Figure 7:
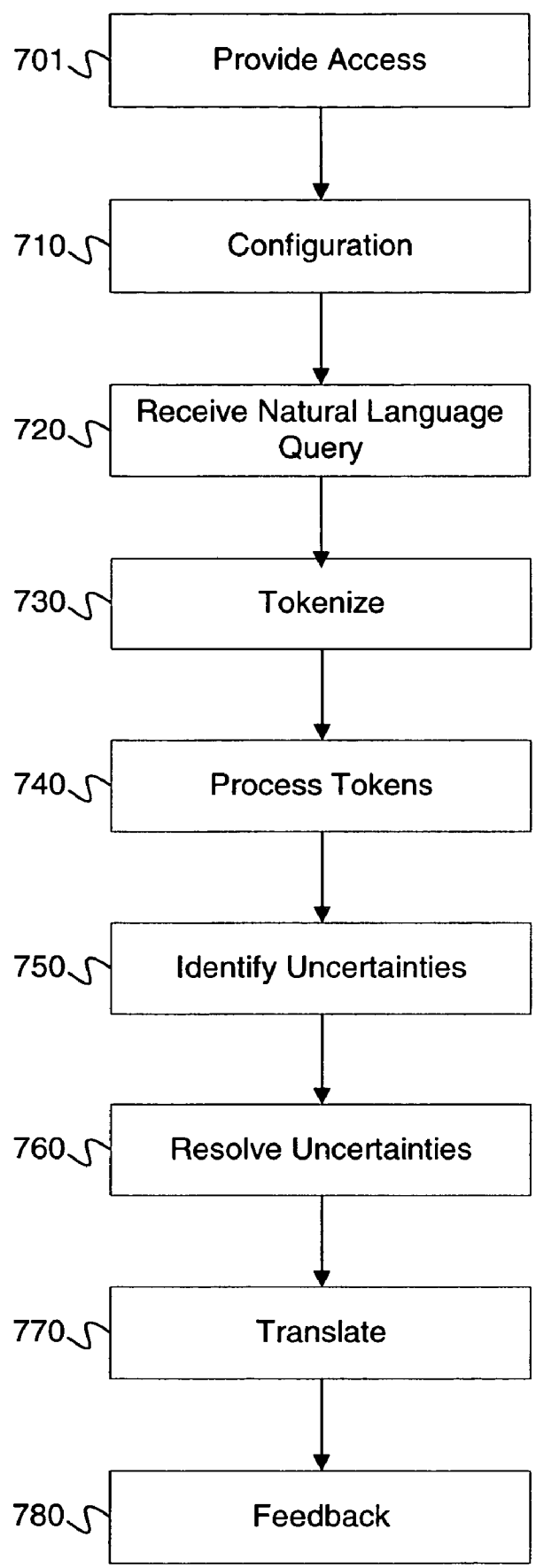
FIG. 7 is a flowchart depicting stages of a method consistent with operation of certain implementations of the present invention.

In one implementation, operation of the present invention may be consistent with the steps depicted in the flowchart of FIG. 7. The illustrated process may begin by providing access to NLP 310 (stage 701). Providing access to NLP 310 may, in one example, include providing access to NLP 310 to a user of client 510. Providing access to NLP 310 may also include establishing communication between NLP 310 and one or more applications, which may reside on data processing system 410 and/or client 510. In certain embodiments, interface module 315 may establish sessions. Establishing a session may involve identifying a particular application, identifying a particular user, executing authentication processes, executing security protocols, and loading data.

In the process illustrated by FIG. 7, configuration processes may be executed (stage 710). Such configuration processes may include, for example, initializing the data index in MMDS 325, configuring policies associated with interpretation module 330, and/or embedding NLP 310 functionality within application 419. Configuration may also include retrieving and/or loading corpora associated with users and systems accessing NLP 310. Interface module 315 may access a corpus using an application ID retrieved from memory. In one example, client devices (e.g., 510) may have unique IDs which could be transmitted to interface module 315 and used to identify a particular user or environment. Further, users could have unique user IDs and/or passwords. In one particular implementation, a public key infrastructure (PKI) employing public key cryptography may be leveraged to perform user authentication processes.

Configuration may also include accessing information from a reference corpus. In exemplary embodiments of the instant invention, one or more reference corpora may be established from which other corpora, such as personal corpora corresponding to a user, inherit data. The reference corpus may include a master list of pre-configured associations. The reference corpora may serve as a vehicle for distributing information (e.g., associations) to a plurality of personalized NLP 310s. For example, user personal corpora may begin as a copy of a reference corpus that then is modified to include user specific information. In another embodiment consistent with the present invention, NLP 310s may utilize both reference corpora that are globally updated and personal user corpora that comprise user specific information.

In certain embodiments, configuration may include customizing auxiliary parameters. Auxiliary parameters may include, but are not limited to, information associated with linguistics, such as rules, morphological markers, or thresholds. The auxiliary parameters may relate to language used to influence functionality associated with tokenization module 320 and MMDS module 325. Auxiliary linguistic parameters also assist in identifying and matching tokens with information in the data index. One example of auxiliary parameters are morphological markers that may, for example, be used in determining words with the same root or stem. For example, if morphological markers, such as the endings "s," "ed," and "ing," are stored in a table and compared to a list of words, such as "links," "linked," and "linking," it may be determined that all three words have the same root or stem, "link." Auxiliary parameters may also be thresholds. In one embodiment consistent with the present invention, thresholds are used to determine words that occur too frequently to be a distinguishing characteristic. Another example of an auxiliary parameter is a rule whereby if a token contains a certain character or string x, the token is then modified by substituting y for x, where y is another character or string.

At this point, a natural language query may be received (stage 720). In one example, a user of application 419 residing on client 510 could be prompted to input a description (by interface module 315) and may input the description via input device 522. The description may be transmitted from application 419 to interface module 315 for processing (e.g., via network 515). Upon receiving a natural language query, interface module 315 may route the query to tokenization module 320.

Upon receiving the natural language query, tokenization module 320 may tokenize the query (stage 730) by generating one or more semantic tokens, as discussed above. Tokenization module 320 may forward the semantic tokens to MMDS module 325 (e.g., via XML) for processing.

Upon receiving the semantic tokens, MMDS module 325 may process the tokens (stage 740). Processing tokens may involve executing a low-level semantic analyses in order to identify terms having a semantic relationship with the tokens (e.g., synonyms). MMDS module 325 may maintain and consult a table of such semantic terms in order to identify the semantically-related terms. Such a table may be initialized during configuration (stage 710).

Processing tokens may also include searching the data index maintained by MMDS module 325 to find matching information. In one configuration, MMDS module 325 may generate match scores that correspond to information found in the data index. If no information is found in the data index, an error message may be presented to the user. Or, in certain embodiments, a user may be prompted to manually search for or enter the information in order to teach the MMDS module 325.

After MMDS module 325 searches the data index, it may output (e.g., in XML) a series of addresses, field names, and/or descriptions associated with information found in the data index. This output may be passed to interpretation module 330.

Interpretation module 330 may receive the MMDS module 325 output and identify one or more uncertainties associated with the data (stage 750). For example, interpretation module 330 may identify ambiguities, input deficiencies, imperfect conceptual matches, and/or compound commands.

After identifying the uncertainties, interpretation module 330 may resolve the uncertainties (stage 760). Interpretation module 330 may, for example, leverage interface module 315 in order to present the identified uncertainties to the user and request information from the user. In other instances, interpretation module 330 may apply configurable policies/rules to resolve the uncertainties. In addition, interpretation module 330 may leverage its context awareness to resolve the uncertainties.

After resolving any identified uncertainties, interpretation module 330 may generate a "winning" combination of information (e.g., meta data, master data, function calls, etc.). The winning combination may be passed to actuation module 335, e.g., via XML.

Upon receiving the winning combination, actuation module 335 may translate (stage 770) the winning combination into one or more system-actionable commands, queries, and/or API calls. Actuation module 335 may, in one embodiment, send one or more requests and or commands to various systems and applications coupled to NLP 310 using, for example, SQL, Web Services, RMI, RFCs, BAPIs, etc. Using information responsive to such requests, actuation module 335 may build one or more presentations, displays, and/or interfaces for the user.

Consistent with certain embodiments of the present invention, actuation module 335 may translate the winning combination in order to provide the relevant information to users. Providing the relevant information may include visually displaying relevant information (e.g., via a hit list of links) to the user via output device 524 in client 510. Providing the relevant information could also include causing audible sounds to be provided via a speaker. For example, a synthesized or pre-recorded human voice may describe the entities for the user via the speaker.

Consistent with certain embodiments of the present invention, the process illustrated in FIG. 7 may include receiving feedback (stage 780). For example, a user may input feedback (e.g., via input device 522) with respect to provided search results. Such feedback may indicate whether or not the information provided to the user coincides with the user intent. In one embodiment, interface module 315 may prompt users (e.g., via one or more GUI elements) to input feedback. Such feedback may be leveraged by NLP 310 in order to improve the efficiency and accuracy of one or more natural language processing functions.

The steps illustrated in the flowchart of FIG. 7 are consistent with exemplary implementations of the instant invention. Further, it should be understood that the sequence of events described in FIG. 7 are exemplary and not intended to be limiting. Thus, other method steps may be used, and even with the method depicted in FIG. 7, the particular order of events may vary without departing from the scope of the present invention. Moreover, certain steps may not be present and additional steps may be implemented in FIG. 7. For example, stage 780 (feedback) may not be present in some implementations of the present invention. In addition, it should be understood that the stages of FIG. 7 may be modified with departing from the scope of the present invention.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention.

The present invention has been described in relation to particular examples which are intended in all respects to be illustrative rather than restrictive. Different combinations of hardware, software, and firmware may be suitable for practicing embodiments of the present invention. Moreover, embodiments consistent with the present invention may be embodied on a computer readable medium.

Additionally, other embodiments of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed embodiment, implementation, or configuration. Thus, the true scope and spirit of the invention depends on the following claims.

What is claimed is:

1. A method for processing natural language queries comprising:
    obtaining a natural language query from a user;
    generating at least one semantic token from the natural language query;
    identifying data in a knowledge base using the at least one semantic token;
    interpreting the identified data based on an intention associated with the user, wherein the intention is expressed in a personalized policy, and wherein interpreting the identified data comprises:
        recognizing an uncertainty in the natural language query, wherein the uncertainty comprises at least one of:
            a lack of identified data in the knowledge base;
            the natural language query including a series of dependent commands without information associated with a sequence of the commands; and
            the identified data including a plurality of conceptually similar elements that relate to a generated semantic token; and
        resolving the uncertainty based on the user intention, wherein resolving the uncertainty comprises:
            establishing the personalized policy for the user;
            applying the personalized policy in conjunction with contextual data obtained from the user to resolve the uncertainty, the contextual data comprising data relating to the user's location and sensor data;
            receiving feedback from the user relating to the application of the personalized policy; and
            re-configuring the personalized policy based on the feedback; and actuating the interpreted data.

2. The method of claim 1, wherein obtaining the natural language query comprises obtaining at least one of an alphanumeric character, an audio signal, and a visual signal.

3. The method of claim 1, wherein identifying data in a knowledge base comprises searching a structured data archive using the semantic token.

4. The method of claim 1, wherein actuating the interpreted data comprises translating the interpreted data into at least one system-actionable command.

5. The method of claim 1, wherein actuating the interpreted data comprises providing the interpreted data to the user.

6. The method of claim 1, the method further comprising:
identifying at least one term having a semantic relationship with the at least one semantic token.

7. The method of claim 6, wherein identifying data in a knowledge base comprises identifying data in a knowledge base using the at least one semantic token and the at least one semantically-related term.

8. The method of claim 7, wherein the at least one semantically-related term comprises a synonym.

9. The method of claim 1, wherein resolving the uncertainty further comprises establishing a dialog with the user.

10. The method of claim 1, wherein resolving the uncertainty further comprises applying a preset rule.

11. A method for processing natural language queries comprising:
obtaining a natural language query from a user;
generating at least one semantic token from the natural language query;
identifying data in a knowledge base using the at least one semantic token;
determining an intention associated with the user based on the identified data, wherein the intention is expressed in a personalized policy and, wherein determining the intention associated with the user comprises:
  recognizing an uncertainty in the natural language query, wherein the uncertainty comprises at least one of:
    a lack of identified data in the knowledge base;
    the natural language query including a series of dependent commands without information associated with a sequence of the commands; and
    the identified data including a plurality of conceptually similar elements that relate to a generated semantic token; and
  resolving the uncertainty, wherein resolving the uncertainty comprises:
    establishing the personalized policy for the user;
    applying the personalized policy in conjunction with contextual data obtained from the user to resolve the uncertainty, the contextual data comprising data relating to the user's location and sensor data;
    receiving feedback from the user relating to the application of the personalized policy; and
    re-configuring the personalized policy based on the feedback; and
  providing information that is relevant to the natural language query to the user based on the determined intention.

12. The method of claim 11, wherein resolving the uncertainty further comprises establishing a dialog with the user.

13. The method of claim 11, wherein resolving the uncertainty further comprises applying a preset rule.

14. The method of claim 11, the method further comprising:
identifying at least one term having a semantic relationship with the at least one semantic token generated from the natural language query.

15. The method of claim 14, wherein identifying data in a knowledge base comprises identifying data in a knowledge base using the at least one semantic token and the at least one semantically-related term.

16. The method of claim 15, wherein the at least one semantically-related term comprises a synonym.

17. A method for processing natural language queries comprising:
obtaining a natural language query from a source;
retrieving data that is potentially relevant to the natural language query from a knowledge base;
determining an intention associated with the natural language query, wherein the intention is expressed in a personalized policy; and
processing the potentially relevant data in accordance with the intention so as to identify actually relevant data from the potentially relevant data, wherein processing the potentially relevant data comprises:
  establishing the personalized policy for the user;
  applying the personalized policy in conjunction with contextual data obtained from the user to identify the actually relevant data from the potentially relevant data, the contextual data comprising data relating to the user's location and sensor data;
  receiving feedback from the user relating to the application of the personalized policy; and
  re-configuring the personalized policy based on the feedback; and
providing the actually relevant data to the source.

18. The method of claim 17, wherein obtaining the natural language query comprises obtaining at least one of an alphanumeric character, an audio signal, and a visual signal from a user.

19. The method of claim 17, wherein retrieving the potentially relevant data comprises searching a structured data archive using at least one semantic token derived from the natural language query.

20. The method of claim 17, wherein determining the intention comprises interacting with a user to determine the intention.

21. The method of claim 17, wherein processing the potentially relevant data further comprises applying a preset rule in accordance with the intention.

22. A method for processing natural language queries, comprising:
obtaining a natural language query from a user;
generating at least one semantic token from the natural language query;
identifying data in a knowledge base using the at least one semantic token;
identifying an uncertainty in the natural language query, wherein the uncertainty comprises at least one of:
  a lack of identified data in the knowledge base;
  the natural language query including a series of dependent commands without information associated with a sequence of the commands; and
  the identified data including a plurality of conceptually similar elements that relate to a generated semantic token;
determining an intention associated with the user based on the identified data, wherein the intention is expressed in a personalized policy; and
resolving the identified uncertainty based on the determined intention, wherein resolving the uncertainty comprises:
  establishing the personalized policy for the user;
  applying the personalized policy in conjunction with contextual data obtained from the user to resolve the uncertainty, the contextual data relating to the user's location and sensor data;

receiving feedback from the user relating to the application of the personalized policy; and re-configuring the personalized policy based on the feedback.

23. The method of claim 22, wherein identifying an uncertainty comprises identifying that additional information is required from the user.

24. A system for processing natural language queries, comprising:

means for obtaining a natural language query from a user;

means for generating at least one semantic token from the natural language query;

means for identifying data in a knowledge base using the at least one semantic token;

means for determining an intention associated with the user based on the identified data, wherein the intention is expressed in a personalized policy, and wherein means for determining an intention associated with the user comprises:

means for recognizing an uncertainty in the natural language query, wherein the uncertainty comprises at least one of:

a lack of identified data in the knowledge base;

the natural language query including a series of dependent commands without information associated with a sequence of the commands; and the identified data including a plurality of conceptually similar elements that relate to a generated semantic token; and means for resolving the uncertainty, the means for resolving the uncertainty comprising:

means for establishing the personalized policy for the user;

means for applying the personalized policy in conjunction with contextual data obtained from the user to resolve the uncertainty the contextual data comprising data relating to the user's location and sensor data;

means for receiving feedback from the user relating to the application of the personalized policy; and means for re-configuring the personalized policy based on the feedback; and means for providing information that is relevant to the natural language query to the user based on the determined intention.

25. A system for processing natural language queries, comprising:

means for obtaining a natural language query from a user;

means for generating at least one semantic token from the natural language query;

means for identifying data in a knowledge base using the at least one semantic token;

means for identifying an uncertainty in the natural language query, wherein the uncertainty comprises at least one of:

a lack of identified data in the knowledge base;

the natural language query including a series of dependent commands without information associated with a sequence of the commands; and the identified data including a plurality of conceptually similar elements that relate to a generated semantic token;

means for determining an intention associated with the user based on the identified data, wherein the intention is expressed in a personalized policy; and means for resolving the identified uncertainty based on the determined intention, wherein the means for resolving the uncertainty comprises:

means for establishing the personalized policy for the user;

means for applying the personalized policy in conjunction with contextual data obtained from the user to resolve the uncertainty, the contextual data comprising data relating to the user's location and sensor data;

means for receiving feedback from the user relating to the application of the personalized policy; and means for re-configuring the personalized policy based on the feedback.

26. A natural language query processing system, comprising:

an interface module configured to receive a natural language query;

a tokenizing module configured to generate at least one semantic token based on the received natural language query;

a searching module configured to retrieve information from a knowledge base using the at least one semantic token;

an interpretation module configured to:

identify an uncertainty associated with the natural language query, wherein the uncertainty comprises at least one of:

a lack of retrieved information from the knowledge base;

the natural language query including a series of dependent commands without information associated with a sequence of the commands; and the retrieved information including a plurality of conceptually similar elements that relate to a generated semantic token; and resolve the uncertainty, wherein resolving the uncertainty comprises:

establishing a personalized policy, applying the personalized policy in conjunction with contextual data obtained from the user to resolve the uncertainty, the contextual data comprising data relating to the user's location and sensor data, receiving feedback relating to the application of the personalized policy, and re-configuring the personalized policy based on the feedback, and process the retrieved information so as to resolve the uncertainty based on an intention associated with the received natural language query, wherein the intention is expressed in the personalized policy; and an actuation module configured to translate the processed information into a system-actionable command.

27. The system of claim 26, wherein the interface module is configured to receive the natural language query from at least one of image capture device, an audio capture device, a keyboard, a mouse, a touch screen.

28. The system of claim 26, wherein the interface module is configured to receive the natural language query from a data processing system via a network.

29. The system of claim 26, wherein the tokenizing module is further configured to discard at least one element of the natural language query.

30. The system of claim 26, wherein the searching module is configured to retrieve the information from a structured data archive.

31. The system of claim 26, wherein the searching module is further configured to identify at least one term having a semantic relationship with the at least one semantic token.

32. The system of claim 31, wherein the searching module is configured to retrieve information from the knowledge base using the at least one semantic token and the semantically-related term.

33. The system of claim 32, wherein the semantically-related term comprises one of a synonym and a hypernym.

34. The system of claim 26, wherein the interpretation module is configured to resolve the uncertainty based on an intention associated with the received natural language query by retrieving information from a user.

35. The system of claim 26, wherein the interpretation module resolves the uncertainty by applying a preset rule.

36. A natural language query processing system, comprising:
an interface module configured to receive a natural language query;
a tokenizing module configured to generate at least one semantic token based on the received natural language query;
a searching module configured to retrieve information from a knowledge base using the at least one semantic token;
an interpretation module configured to:
determine an intention associated with the received natural language query, wherein the intention is expressed in a personalized policy, and
process the retrieved information in accordance with the intention, wherein the interpretation module processes the retrieved information by:
establishing the personalized policy;
applying the personalized policy in conjunction with contextual data obtained from the user to resolve an uncertainty in the natural language query, the contextual data comprising data relating to the user's location and sensor data;
receiving feedback relating to the application of the personalized policy; and
re-configuring the personalized policy based on the feedback; and
an actuation module configured to provide the processed information to a user.

37. The system of claim 36, wherein the interface module is configured to receive the natural language query from at least one of image capture device, an audio capture device, a keyboard, a mouse, a touch screen.

38. The system of claim 36, wherein the interface module is configured to receive the natural language query from a data processing system via a network.

39. The system of claim 36, wherein the tokenizing module is further configured to discarding at least one element of the natural language query.

40. The system of claim 36, wherein the searching module is configured to retrieve the information from a structured data archive.

41. The system of claim 36, wherein the searching module is further configured to identify at least one term having a semantic relationship with the at least one semantic token.

42. The system of claim 41, wherein the searching module is configured to retrieve information from the knowledge base using the at least one semantic token and the semantically-related term.

43. The system of claim 42, wherein the semantically-related term comprises a synonym and a hypernym.

44. The system of claim 36, wherein the interpretation module is configured to determine the intention by communication with a user.

45. The system of claim 36, wherein the interpretation module determines the intention by:
recognizing an uncertainty associated with the natural language query, wherein the uncertainty comprises at least one of:
a lack of retrieved information from the knowledge base;
the natural language query including a series of dependent commands without information associated with a sequence of the commands; and
the retrieved information including a plurality of conceptually similar elements that relate to a generated semantic token; and
retrieving clarifying data from a user in order to resolve the uncertainty.

46. The system of claim 45, wherein the interpretation module retrieves clarifying data from a user by establishing a dialog with the user via a data processing system.

47. The system of claim 36, wherein the interpretation module processes the retrieved information by applying a preset rule.

48. A computer-readable medium containing instructions for controlling a computer system coupled to a network to perform a method, the computer system having a processor for executing the instructions, the method comprising:
obtaining a natural language query from a source;
retrieving data that is potentially relevant to the natural language query from a knowledge base;
determining an intention associated with the natural language query, wherein the intention is expressed in a personalized policy; and
processing the potentially relevant data in accordance with the intention so as to separate the potentially relevant data into actually relevant data and actually irrelevant data, wherein the interpretation module processing the potentially relevant data comprises:
establishing the personalized policy;
applying the personalized policy in conjunction with contextual data obtained from the source to resolve an uncertainty in the natural language query, the contextual data comprising data relating to location and sensor data, wherein the uncertainty comprises at least one of:
a lack of retrieved data from the knowledge base;
the natural language query including a series of dependent commands without information associated with a sequence of the commands; and
the retrieved data including a plurality of conceptually similar elements that relate to a generated semantic token;
receiving feedback relating to the application of the personalized policy; and
re-configuring the personalized policy based on the feedback; and
providing the actually relevant data to the source.

* * * * *